US006633826B1

United States Patent
Schmidt (12)

(10) Patent No.: US 6,633,826 B1
(45) Date of Patent: Oct. 14, 2003

(54) SIGNAL-IDENTIFYING CIRCUIT ARRANGEMENT

(75) Inventor: Dieter Schmidt, Nesselwang (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 57 days.

(21) Appl. No.: 09/679,241

(22) Filed: Oct. 4, 2000

Related U.S. Application Data

(60) Provisional application No. 60/165,858, filed on Nov. 16, 1999.

(30) Foreign Application Priority Data

Oct. 7, 1999 (DE) ........................................ 199 48 430

(51) Int. Cl.[7] ............................................. G01R 31/00
(52) U.S. Cl. ..................... 702/117; 702/117; 702/57; 702/89; 702/104; 324/72.5; 324/76.39; 324/601; 700/52; 700/67; 710/65; 710/69; 710/71
(58) Field of Search .............................. 702/57, 64, 65, 702/86, 88, 89, 96–99, 104, 107, 127, 130, 137, 138, 189, 190; 324/72.5, 76.39, 76.77, 76.82, 600, 601–608, 629, 691, 713, 721; 700/50, 52, 53, 67; 710/62, 65, 69, 71; 327/3, 4, 7, 9, 11, 17, 19, 27, 37, 40, 56, 60, 63, 108, 132; 361/5–7, 11, 21, 24, 26, 27, 30, 31, 33, 56, 57

(56) References Cited

U.S. PATENT DOCUMENTS 4,479,241 A * 10/1984 Buckley ...................... 382/15
5,083,288 A * 1/1992 Somlyody et al. .......... 364/550
5,335,186 A     8/1994 Tarrant
5,548,660 A * 8/1996 Lemelson .................... 382/116
5,550,556 A * 8/1996 Wu et al. ..................... 345/14
5,557,197 A    9/1996 Schulze et al.

FOREIGN PATENT DOCUMENTS

| DE | 3921962 | 1/1991 |
| DE | 41 24 041 | 1/1993 |
| DE | 41 24 042 | 1/1993 |
| WO | WO 89/02578 | 3/1989 |

OTHER PUBLICATIONS

Profos, Paul and Pfeifer, Tilo, *Handbuch der industriallen MeΘtechnik,* R. Oldenbourg Verlag München Wien 1992, pp. 184–187.

Voigt, D., *Ein frei programmierbares mikroprozessorgesteuertes Datensystem für die Erfassung, Übertragung, Speicherung und Auswertung von MeΘwerten,* Messen + Prüfen/automatik,Jul./Aug. 1982, pp. 475–476, 479–481.

* cited by examiner

*Primary Examiner*—Marc S. Hoff
*Assistant Examiner*—Elias Desta
(74) *Attorney, Agent, or Firm*—Bose McKinney & Evans LLP

(57) ABSTRACT

The circuit arrangement serves to identify an input signal ($s1$) assigned to a predetermined signal class. It comprises signal-matching electronics (1) responsive to a current component and/or a voltage component of the input signal ($s1$) and providing a corresponding output signal ($s2$). By means of signal recognition electronics (2) of the circuit arrangement, the output signal ($s2$) is transformed into a recognition signal ($c1$) representative of the signal class.

24 Claims, 1 Drawing Sheet

SIGNAL-IDENTIFYING CIRCUIT ARRANGEMENT

This application claims the benefit of application No. 60/165,858 filed Nov. 16, 1999.

FIELD OF THE INVENTION

This invention relates to a circuit arrangement for identifying classified signals.

BACKGROUND AND SUMMARY OF THE INVENTION

By means of industrial measurement devices, measurands, such as pH value, pressure, temperature, or tank-contents level, are converted into measured-value-carrying electric measurement signals. To accomplish this, the measurand is sensed by means of suitable sensing elements, such as pH electrodes, pressures cells, thermistors, or resistance strain gages, and modulated onto a current component or a voltage component of the measurement signal by means of suitable measurement electronics, such as a resistance bridge. Since sensors can be used only over respective limited measurement ranges of the measurand, the measured values are also represented in a limited current or voltage range.

These current and voltage ranges are generally standardized. Current-modulated measurement signals, for example, are preferably used in a current range of 4 mA . . . 20 mA. Other types of measurement signals familiar to those skilled in the art are, for example, voltage-modulated signals in a voltage range of 0 to 10 V.

To indicate, record, or further process the measured values from the measurement signal and to determine corresponding measurement results, the measurement devices are followed by analog and/or digital signal-processing units, to which the measurement signal is fed through suitable signal-matching input circuits.

If the measured value is modulated on the current of the measurement signal, the signal-matching input circuit is adjusted to operate in a current-sensing mode, and if the measured value is modulated on the voltage of the measurement signal, the input circuit is adjusted to operate in a voltage-sensing mode. Furthermore, it is usual to use such input circuits to implement a signal preprocessing dependent on the type of the measurement signal, e.g., to amplify and/or filter the measurement signal. To accomplish this, during start-up, the respective input signal must be adapted to the respective current or voltage range to be represented.

The setting and adapting of the signal-processing unit can be very time-consuming, particularly if the signal-processing unit receives output signals from two or more measurement devices simultaneously; this may entail very high downtime and start-up costs. In addition, the setting of the signal-processing unit requires exact knowledge of the type of the measurement signals at the measuring points to be connected.

Accordingly, sufficiently fast start-ups necessitate complicated presettings, particularly of the input circuit, i.e., start-ups of such signal-processing units at short notice are practically impossible. In the case of transportable signal-processing units, repeated start-ups are necessary, involving a correspondingly greater expenditure of time and money.

It is therefore an object of the invention to provide a signal-identifying circuit arrangement for a signal-processing unit which reduces the cost and complication of starting up the signal-processing unit.

To attain this object, the invention consists in a circuit arrangement for identifying an input signal belonging to a predetermined signal class, said circuit arrangement comprising:

signal-matching electronics for the input signal which generate an output signal representative of
a current component of the input signal and/or
a voltage component of the input signal; and
signal recognition electronics which derive from the output signal a recognition signal representative of the signal class.

In a first embodiment of the invention, the circuit arrangement comprises setting electronics that derive from the recognition signal a setting signal serving to set and/or parameterize the signal-matching electronics.

In a second embodiment of the invention, the circuit arrangement comprises a current source providing the current component of the input signal.

In a third embodiment of the invention, the input signal is an output signal from a measurement device. In a fourth embodiment of the invention, the circuit arrangement serves as a component of a data-gathering signal-processing unit.

A basic idea of the invention is to use the signal-processing unit in a signal environment of predetermined signal classes and apply to it, particularly during start-up of the circuit arrangement, an input signal belonging to one of these signal classes and to determine the signal class of the input signal, and thus identify the input signal, by means of the signal recognition electronics.

From the respective detected signal class, inputs for adjusting the signal-matching electronics to operate in a current
or voltage-sensing mode and, if necessary, for a corresponding parameterization of the signal-matching electronics are derived, which are implemented automatically or semiautomatically in communication with the user.

One advantage of the invention is that during start-up, based on an identification of the input signal, the circuit arrangement can be adapted to the input signal automatically and, thus, within a very short time, so that it can be changed to the measuring mode correspondingly fast.

Another advantage of the invention is that during start-up of the signal-processing unit, circuit arrangements not in use, i.e., not having an input signal applied to them, can be identified and, thus, deactivated. Conversely, such circuit arrangements can be activated later during operation of the signal-processing unit and set in a corresponding manner.

The invention and further advantages will become more apparent from the following description of embodiments when taken in conjunction with the accompanying drawing.

DESCRIPTION OF THE DRAWINGS

Like parts are designated by like reference characters throughout the figures; if necessary for the sake of clarity, reference characters that were already used are omitted in subsequent figures. In the drawings.

DESCRIPTION OF THE INVENTION

Figure 1:
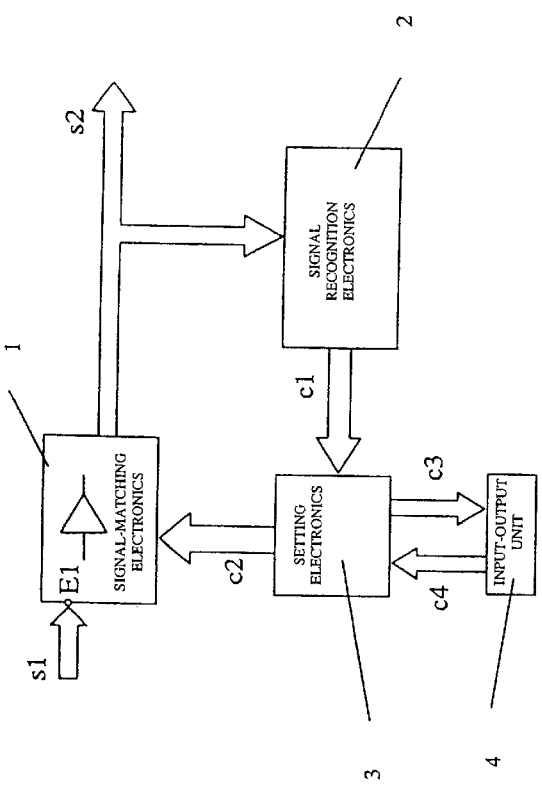
FIG. 1 is a block diagram of a circuit arrangement with signal-matching electronics and with signal recognition electronics for identifying an input signal.

FIG. 1 is a block diagram of a circuit arrangement which, as one component of a partly shown signal-processing unit, particularly of a data-gathering unit, such as a data storage device and/or a data display device, serves to convert an applied information-carrying input signal s1 to an information-carrying first output signal s2, particularly a digital signal, that can be further processed by components following the signal-processing electronics, particularly by evaluation electronics (not shown).

The input signal si is, for example, an electric output signal, particularly an analog signal, from a measurement device (not shown), such as a temperature meter, a pressure gage, a flowmeter, a pH meter, or a level meter, that transmits as information a measured value generated by the measurement device or a parameter value representative of the current operating state of this measurement device. The input signal si can also be an output signal from another signal-processing unit (not shown).

According to the invention, the circuit arrangement is intended for use in a signal environment that provides signals of different kinds serving as the input signal s1, these signals being assignable to at least a first predetermined signal class, such as a class for current signals, and/or a second predetermined signal class, such as a class for voltage signals. The term "signal environment" as used herein means an ensemble of different, classifiable signals for respective concrete applications of the circuit arrangement which are generated by means of suitable signal sources and fed to the circuit arrangement, said ensemble being predefined, particularly by the measurement devices used, and arranged in individual signal classes.

Current signals are commonly generated as output signals of a signal source, such as an amplifier circuit configured as a voltage-controlled current source, which delivers an essentially constant voltage that is essentially independent of the magnitude of an information-carrying current component, at least within a predeterminable current range. By contrast, voltage signals are commonly generated by means of a signal source, such as an amplifier circuit configured as a voltage-controlled voltage source, which delivers an essentially constant current that is essentially independent of the magnitude of an information-carrying voltage component, at least within a predetermined voltage range. Furthermore, the voltage-signal source can be a resistor that is traversed by a predetermined current and whose value is dependent on a process quantity to be measured.

In signal environments of industrial measurement and communications technology, the information carriers are generally current signals in a current range of, e.g., 0 to 20 mA or 4 mA to 20 mA and voltage signals in a voltage range of, e.g., 0 to 1 V, 0 to 10 V, 19 mV to 390 mV, or −10 mV to 80 mV. Each of these ranges is definable as a predetermined signal class of this signal environment.

(Accordingly, prior to start-up of the signal-processing unit, the circuit arrangement must be set depending on the signal class of the respective input signal s1 to be transmitted so that the information will be mapped uniformly onto the output signal s2 independently of the information carrier, i.e., also independently of the information-carrying current or voltage range. The output signal s2 can be a voltage signal that represents the information in a predetermined voltage range of 0 to 1 V.

As shown in FIG. 1, the circuit arrangement comprises signal-matching electronics 1, particularly electronics that are parameterizable in operation, with a first signal terminal E1 for the input signal s1, particularly a disable terminal, the signal-matching electronics 1 being settable to a mode in which it responds to a current component/or a voltage component of the input signal s1. The signal-matching electronics 1 can be implemented, for example, with amplifier circuits of predeterminable, particularly variable, gain and input impedance that are configured as current-controlled or voltage-controlled voltage sources. Such variable input impedances and gains are commonly realized by means of controlled impedance networks and/or by means of field-effect transistors.

The circuit arrangement further comprises signal recognition electronics 2, which deliver a quantized recognition signal c1 that is representative of the signal class of the input signal s1 and thus identifies this signal. The signal recognition electronics 2 serve, particularly during start-up of the signal-processing unit, to classify the input signal s1 changed to the output signal s2, i.e., to assign this input signal s1 to a predetermined signal class, particularly to the first signal class and/or the second signal class, and thus identify this signal, particularly its information carrier. The recognition signal c1 may consist of signal level sequences of a single signal output of the signal recognition electronics 2 or of an ordered sequence of instantaneous signal levels of two or more signal outputs of the signal recognition electronics 2. Particularly for the latter case, each signal class can advantageously be assigned a respective signal output, which can be used for direct indication. If a number n of signal outputs with binary levels is used, the recognition signal c1 can assume $2^n-1$ different binary states, i.e., up to $2^n-1$ signal classes, for example, can be encoded with the signal recognition electronics 2. 9 If multiple-valued signal levels are used, particularly in a normalized range of values greater than or equal to logic ZERO and less than or equal to logic ONE, the recognition signal c1 can also serve to establish an indeterminate, e.g., fuzzy-logic and/or probability-induced, assignment of the input signal s1 to the signal classes. For this case, the input signal s1 is assignable, e.g. with a membership share of 0 to 100% per signal class, to two or more signal classes simultaneously, particularly as a function of probabilities of occurrence determined a priori for the signal classes of the respective signal environment.

The adjustment of the signal-matching electronics 1 to operate, for example, in a current-component-sensing and/or voltage-component-sensing mode takes place already during the aforementioned start-up phase of the signal-processing unit, namely in a timed mode and/or in an event-driven mode, particularly in a dialog with an interacting user.

To this end, the circuit arrangement comprises setting electronics 3, which deliver a likewise quantized setting signal c2. The setting signal is an ensemble of binary and/or analog signal levels that are generated at signal outputs of the setting electronics 3 connected to corresponding setting inputs or parameter inputs of the signal-matching electronics 1.

The setting signal c2 serves, on the one hand, to adjust the signal-matching electronics 1 temporarily, particularly during the start-up phase of the signal-processing unit, to operate in a current-component-sensing and/or voltage-component-sensing mode as described above, and to suitably parameterize them. On the other hand, the setting signal c2 can also serve to deactivate the signal-matching electronics 1 when no input signal s1 is applied or identified. Furthermore, the setting signal c2 can be used to parameterize signal filters of the signal-matching electronics, particularly of its filter arrangement and its upper and/or lower cutoff frequencies. Such signal filters, particularly first-order low-pass filters with an upper cutoff frequency not greater than 5 Hz, are used, for example, if thermocouple or resistance thermometers are connected directly to the signal-matching electronics 1.

Figure 2:
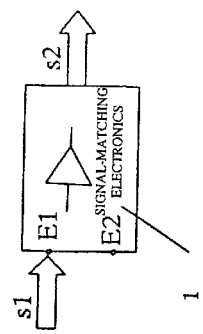
FIG. 2 shows a development of the signal-matching electronics.

To implement the dialog with the user, the setting electronics 3 derive from the applied recognition signal c1 an indication signal c3 that is representative of the signal class of the input signal s1 and serves to drive an input-output unit 4 of the circuit arrangement. Furthermore, the setting electronics 3 receive a control signal c4 from the input-output unit 4 which is representative of the user inputs. The input-output unit 4 can be a monitor with a touch screen/or with a keyboard, for example. Advantageously, the recognition signal c1 can also serve to generate the setting signal c2. According to a development of the invention, shown in FIG. 2, the signal-matching electronics 1 have a second signal terminal E2 for the input signal s1, particularly a disable terminal. The input signal s1 is an output signal from a signal distributor module connected, at least temporarily, to the signal-matching electronics 1, e.g., a terminal strip and/or plug connector strip following the above-mentioned measurement device. The signal distributor module is configured to apply the input signal s1 to the signal terminal E1 only if the input signal s1 is of the first signal class, e.g., a current signal. Furthermore, the signal distributor module is configured to apply the input signal s1 to the signal terminal E2 only if the input signal s1 is of the second signal class, e.g., a voltage signal.

Figure 3:
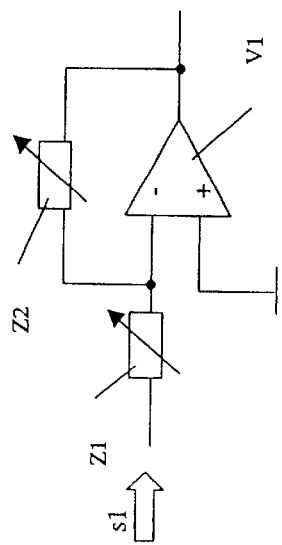
FIG. 3 shows a subcircuit of the signal-matching electronics.

In another preferred embodiment of the invention, shown in FIG. 3, the signal-matching electronics 1 comprise a first amplifier circuit V1, to which the input signal s1 is applied through a variable first impedance Z1, e.g., a resistor, having a smallest resistance value of practically 0 Ω, to an inverting amplifier input. The amplifier circuit V1 is provided with a variable second is impedance Z2, which connects its output to the inverting input. The input impedance of the amplifier circuit V1 is variable by means of the impedance Z1, and the gain is variable by means of the two impedances Z1, Z2.

In a further preferred embodiment of the invention, the impedance Z1 is adjusted so that the input signal s1 is applied to the amplifier input over a path of practically zero resistance, so that the signal-matching electronics 1 are configured to respond to a current component of the input signal si, particularly a component carrying the information, and to map this current component onto the output signal s2.

In another preferred embodiment of the invention, the impedance Z1 is adjusted to a high value, e.g., to 1kΩ or 1MΩ. Thus, the signal-matching electronics 1 are configured to respond to a voltage component of the input signal s1, particularly a component carrying the information, and to map this voltage component onto the output signal s2.

In a further preferred embodiment of the invention, the impedance Z1 has a greatest resistance value of practically infinity, whereby a practically open switch is implemented at the input of the signal-matching electronics 1.

In another preferred embodiment of the invention, the signal-matching electronics 1 are so configured that their output signal s2 represents simultaneously a current component and a voltage component of the input signal s1, particularly a ratio of the voltage component to the current component. To this end, the signal-matching electronics 1 include a current-component-sensing second amplifier circuit. For this case, the amplifier circuit V1 is adjusted to operate in a voltage-component-sensing mode.

Figure 4:
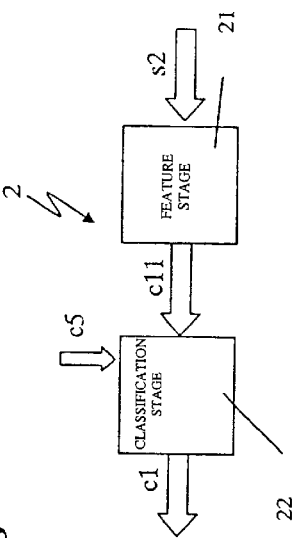
FIG. 4 shows a preferred embodiment of the signal recognition electronics.

To generate the recognition signal c1, in a preferred embodiment of the invention, shown in FIG. 4, the signal recognition electronics 2 comprise a feature stage 21, which serves to transform the output signal s2 into an ensemble of features representative of this output signal. To this end, the feature stage 21 generates a quantized feature signal c11, e.g., a signal quantized bit by bit, i.e., divided into bits representative of the features.

The feature signal c11 preferably has at least a first logic state if the input signal s1 belongs to the first signal class, and at least a second logic state if the input signal s1 belongs to the second signal class.

Furthermore, the feature signal c11 preferably assumes at least a third logic state if the input signal s1 is assignable neither to the first nor to the second signal class.

To represent features, use can be made, for example, of comparator circuits and/or fuzzy sets that are implemented in programmable function memories, particularly in an EPROM or EEPROM, of the feature stage 21, compare the output signal s2 with predetermined reference values and/or reference functions, and deliver binary logic comparison values and/or fuzzy logic membership values at corresponding bits of the feature signal c11.

As shown in FIG. 4, the feature stage 21 of the signal recognition electronics 2 is followed by a classification stage 22, which serves to interpret the feature signal c11, i.e., to map predetermined bits of the quantized feature signal c11 onto the recognition signal c1 and thus identify the input signal s1.

In a further preferred embodiment of the invention, the feature signal c11 is interpreted using an ensemble of binary logic and/or fuzzy logic decision rules that combine the features represented by the individual bits of the feature signal c11. Such binary logic decision rules can be represented, for example, by means of combinational logic circuits and/or sequential logic circuits that are realized in the signal recognition electronics 2 by means of hard-wired circuits and/or by means of computing routines implemented in a programmable function memory, such as an EPROM or EEPROM, and which deliver the recognition signal c1 as a sequence of weighted binary signal levels, e.g., as a binary-coded sequence. Fuzzy logic decision rules are also commonly represented using computing routines implemented in a programmable function memory. Furthermore, the feature signal c11 can be interpreted using so-called distance classifiers, which determine and interpret its difference from classified and stored feature-signal prototypes.

In a further preferred embodiment of the invention, a likewise quantized setting signal c5, particularly a to digital signal, which serves to interpret the feature signal c11 and represents a current setting and/or a current parameterization of the signal-matching electronics 1, is applied to the classification stage 22. This setting signal c5 is preferably generated by means of the setting electronics 3, but it may also be provided directly by the signal-matching electronics 1.

In a further preferred embodiment of the invention, the input signal s1 is a current signal and is assigned to the first signal class. To identify the input signal s1, a first logic state of the recognition signal c1, which is representative of the first signal class and, thus, of the current component serving as an information carrier, is generated by means of the signal recognition electronics 2. This is done by means of a first feature implemented in the feature stage 21, which represents a difference currently existing between the output signal s2 and a current reference value, this current reference value corresponding to a current strength of the input signal s1 of, e.g., 1 mA. The first feature is preferably represented using a first comparison function, which sets a first bit of the feature signal c11 to logic 1 if an instantaneous value of the output signal is greater than the current reference value. Furthermore, a first decision rule implemented in the classification stage 22 sets the recognition signal c1 to a predetermined first level if the first bit of the feature signal c11 is a logic 1 and a first bit of the setting signal c5, which is representative of the current setting of the signal-matching electronics 1, namely the mode in which the latter respond to the current component of the input signal, is also a logic 1.

In another preferred embodiment of the invention, the input signal s1 is a voltage signal and is assigned to the second signal class. To identify the input signal s1, a second logic state of the recognition signal c1, which represents the second signal class and, thus, the voltage component serving as the information carrier, is z generated by means of the signal recognition electronics 2. This is done using a second feature implemented in the feature stage 21, which represents a difference currently existing between the output signal s2 and a voltage reference value, this voltage reference value corresponding to a voltage level of the input signal s1 of, e.g., 1 V. The second feature is preferably represented using a second comparison function of the feature stage 21, which sets a second bit of the feature signal c11 to logic 1 if an instantaneous value of the output signal is greater than the voltage reference value. Furthermore, a second decision rule implemented in the classification stage 22 sets the recognition signal c1 to a predetermined second level if the second bit of the feature signal c11 is a logic 1 and a second bit of the setting signal c5, which represents the current setting of the signal-matching electronics 1, namely the mode in which the latter responds to the voltage component of the input signal s1, is also a logic 1.

Depending on the signal environment in which the circuit arrangement is or is to be used, in addition to or instead of the above-mentioned signal classes, further signal classes can be formed, e.g., for signals in which a frequency of a voltage component or a current component of the input signal serves as the information carrier, and further, corresponding features and decision rules can be implemented in the signal recognition electronics 2.

Furthermore, integrating and/or differentiating functions evaluating time variations of the input signal s1 can be implemented in the feature stage 21, so that the output signal s2 provided by the signal-matching electronics 1 also represents a voltage component of the input signal s1 differentiated or integrated with respect to time.

To generate the setting signal c2 and/or the indication signal c3, in a further preferred embodiment of the invention, adjustment and/or parameter values for the signal-matching electronics 1 corresponding to the first and second signal classes are listed with associated addresses in a table memory of the setting electronics 3, particularly in a programmable read-only memory. In that case, the recognition signal c1 serves as a memory access address by means of which sets of parameters and/or adjustment values serving as the setting signal c2 and/or the indication signal c3, e.g., for the input impedance and/or the gain of the signal-matching electronics 1, are read from the table memory and delivered at the output of the setting electronics 3 in the manner described above.

Figure 5:
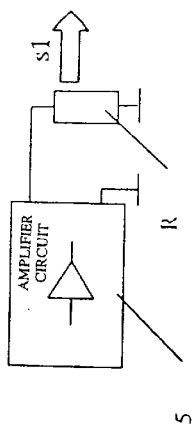
FIG. 5 shows a further development of the signal-matching electronics.

According to a preferred development of the invention, the circuit arrangement comprises an amplifier circuit 5 configured as a current source which, as shown in FIG. 5, serves to feed a constant or variable measurement current serving as the current component of the input signal s1 into a measuring resistor R, e.g., a thermistor or a resistance strain gage, of the above-mentioned measurement device. A resulting voltage drop across the measuring resistor R serves as the information-carrying voltage component of the output signal of the measurement device, i.e., in this case, the input signal s1 is a voltage signal and thus belongs to the second signal class.

If, as is quite common, two or more measurement devices are connected to such signal-processing units, a single signal recognition unit can advantageously be used, to which the individual signal-matching electronics are connected sequentially by means of a multiplexer.

What is claimed is:

1. A circuit arrangement for identifying an input signal delivered from an external measurement device, said input signal belonging to a predetermined signal class, said circuit arrangement comprising:

signal-matching electronics for the input signal which generate an output signal representative of a current component of the input signal and/or a voltage component of the input signal; and signal recognition electronics which derive from the output signal a recognition signal representative of the predetermined signal class of the input signal delivered from the measurement device.

2. A circuit arrangement as claimed in claim 1, comprising setting electronics that derive from the recognition signal a setting signal serving to set and/or parameterize the signal-matching electronics.

3. The circuit arrangement as claimed in claim 1, comprising a current source delivering the current component of the input signal.

4. The circuit arrangement as claimed in claim 1, wherein the input signal is an output signal from a measurement device.

5. The circuit arrangement as claimed in claim 1, which serves as a component of a data-gathering signal-processing unit.

6. The circuit arrangement as claimed in claim 2, comprising a current source for delivering the current component of the input signal.

7. The circuit arrangement as claimed in claim 2, wherein the input signal is an output signal from a measurement device.

8. The circuit arrangement as claimed in claim 3, wherein the input signal is an output signal from a measurement device.

9. The circuit arrangement as claimed in claim 2, which serves as a component of a data-gathering signal-processing unit.

10. The circuit arrangement as claimed in claim 3, which serves as a component of a data-gathering signal-processing unit.

11. The circuit arrangement as claimed in claim 4, which serves as a component of a data-gathering signal-processing unit.

12. A signal-processing unit for processing at least one input signal delivered from an external measurement device, said input signal belonging to a predetermined signal class, said signal-processing unit comprising: a circuit arrangement being coupled to said measurement device at least temporarily, wherein the circuit arrangement uses the input signal delivered from the measurement device to generate a recognition signal representing said predetermined signal class of said input signal delivered from the measurement device.

13. The signal-processing unit as claimed in claim 12, wherein the input signal has a current component and a voltage component and wherein the circuit arrangement comprises signal-matching electronics for converting the input signal to an output signal representing at least one of said current component and said voltage component.

14. The signal-processing unit as claimed in claim 13, wherein the circuit arrangement comprises signal recognition electronics using said output signal from the signal-matching electronics to generate said recognition signal.

15. The signal-processing unit as claimed in claim 13, wherein the circuit arrangement comprises setting electronics using said recognition signal to generate a setting signal for controlling the signal-matching electronics.

16. The signal-processing unit as claimed in claim 15, wherein the setting electronics is coupled to an input-output unit being operable to visualize the signal class.

17. The signal-processing unit as claimed in claim 12, wherein the input signal transmits a measured value generated by the measurement device.

18. The signal-processing unit as claimed in claim 17, wherein the measured value represents a pressure value determined by the measurement device.

19. The signal-processing unit as claimed in claim 17, wherein the measured value represents a temperature value determined by the measurement device.

20. The signal-processing unit as claimed in claim 17, wherein the measured value represents a pH value determined by the measurement device.

21. The signal-processing unit as claimed in claim 17, wherein the measured value represents a tank-contents level value determined by the measurement device.

22. The signal-processing unit as claimed in claim 17, wherein the measured value represents a flow value determined by the measurement device.

23. The signal-processing unit as claimed in claim 12, wherein the input signal transmits a parameter value representing current operating state of the measurement device.

24. A data-gathering unit, comprising a signal-processing unit for processing at least one input signal delivered from an eternal measurement device, said input signal belonging to a predetermined signal class, said signal-processing comprising a circuit arrangement being coupled to said measurement device at least temporarily, wherein the circuit arrangement uses the input signal delivered from the measurement device to generate a recognition signal representing said predetermined signal class of said input signal delivered from the measurement device.

* * * * *